(12) United States Patent
Dowty et al.

(10) Patent No.: US 7,303,234 B2
(45) Date of Patent: Dec. 4, 2007

(54) VEHICLE SEATING WITH ARCUATE MOTION SUPPORT

(75) Inventors: Mark Brian Dowty, Rural Hall, NC (US); Alexander Filip Grauls, Couffouloeux (FR)

(73) Assignee: BE Aerospace, Inc., Wellington, FL (US)

( * ) Notice: Subject to any disclaimer, the term of this patent is extended or adjusted under 35 U.S.C. 154(b) by 0 days.

(21) Appl. No.: 11/461,561

(22) Filed: Aug. 1, 2006

(65) Prior Publication Data

US 2006/0261655 A1 Nov. 23, 2006

Related U.S. Application Data

(62) Division of application No. 11/012,930, filed on Dec. 15, 2004, now Pat. No. 7,083,234.

(60) Provisional application No. 60/589,297, filed on Jul. 20, 2004, provisional application No. 60/529,686, filed on Dec. 15, 2003.

(51) Int. Cl.
A47C 1/02 (2006.01)

(52) U.S. Cl. ........................ 297/314; 297/353

(58) Field of Classification Search ................ 297/314, 297/315, 284.9, 353; 482/95
See application file for complete search history.

(56) References Cited

U.S. PATENT DOCUMENTS

| 0,030,706 A | 11/1860 | Vleck |
| 2,719,571 A | 10/1955 | Taylor |
| 3,466,089 A | 9/1969 | Stueckle |
| 3,583,758 A * | 6/1971 | Radford .................. 297/314 X |
| 3,833,257 A | 9/1974 | Dove |
| 3,964,790 A | 6/1976 | Bergeron |
| 4,018,166 A | 4/1977 | Gutridge et al. |
| 4,408,802 A | 10/1983 | Adomeit et al. |
| 4,756,034 A | 7/1988 | Stewart |
| 5,507,555 A | 4/1996 | Kiguchi |
| 5,560,681 A | 10/1996 | Dixon et al. |
| 5,590,930 A | 1/1997 | Glockl |
| 5,728,049 A | 3/1998 | Alberts |
| 5,857,745 A | 1/1999 | Matsumiya |
| 5,954,401 A | 9/1999 | Koch et al. |
| 5,992,498 A | 11/1999 | Boston |
| 6,059,364 A | 5/2000 | Dryburgh et al. |
| 6,119,980 A | 9/2000 | Ferry |
| 6,273,389 B1 | 8/2001 | Carlgren |
| 6,276,635 B1 | 8/2001 | Ferry et al. |

(Continued)

FOREIGN PATENT DOCUMENTS

DE 3612201 A1 4/1986

(Continued)

*Primary Examiner*—Anthony D. Barfield
(74) *Attorney, Agent, or Firm*—Adams Evans P.A.

(57) ABSTRACT

A passenger seat includes a frame, a bottom, a back, and a headrest, and incorporates a cylindrical motion support member. The support member includes a stationary member carried by the passenger seat, including a concave surface having a cylindrical curvature. A moveable member has a convex surface with a cylindrical curvature disposed in contact with the concave surface, and a support surface for supporting at least a part of a passenger's body The moveable member is selectively positionable along the concave surface. In another variation, the seat back and/or seat bottom is moveable in a conical motion.

9 Claims, 7 Drawing Sheets

U.S. PATENT DOCUMENTS

| | | |
|---|---|---|
| 6,305,644 B1 | 10/2001 | Beroth |
| 6,412,870 B1 | 7/2002 | Higgins et al. |
| 6,494,536 B2 | 12/2002 | Plant |
| 6,692,069 B2 | 2/2004 | Beroth et al. |
| 6,769,739 B2 | 8/2004 | Salzer et al. |
| 6,910,736 B2 | 6/2005 | White |
| 2003/0075962 A1 | 4/2003 | Salzer et al. |
| 2005/0173952 A1 | 8/2005 | Van Der Laan |
| 2003/0085597 A1 | 11/2006 | Ludeke et al. |

FOREIGN PATENT DOCUMENTS

| | | |
|---|---|---|
| DE | 3931436 A1 | 9/1989 |
| EP | 226159 A2 | 12/1986 |
| EP | 1043225 A2 | 10/2000 |
| EP | 1044878 A2 | 10/2000 |
| EP | 1097864 A1 | 5/2001 |
| EP | 0869061 A3 | 11/2006 |
| GB | 2331237 A | 5/1999 |
| JP | 31837 | 1/1991 |
| WO | 2102203 A1 | 12/2002 |

\* cited by examiner

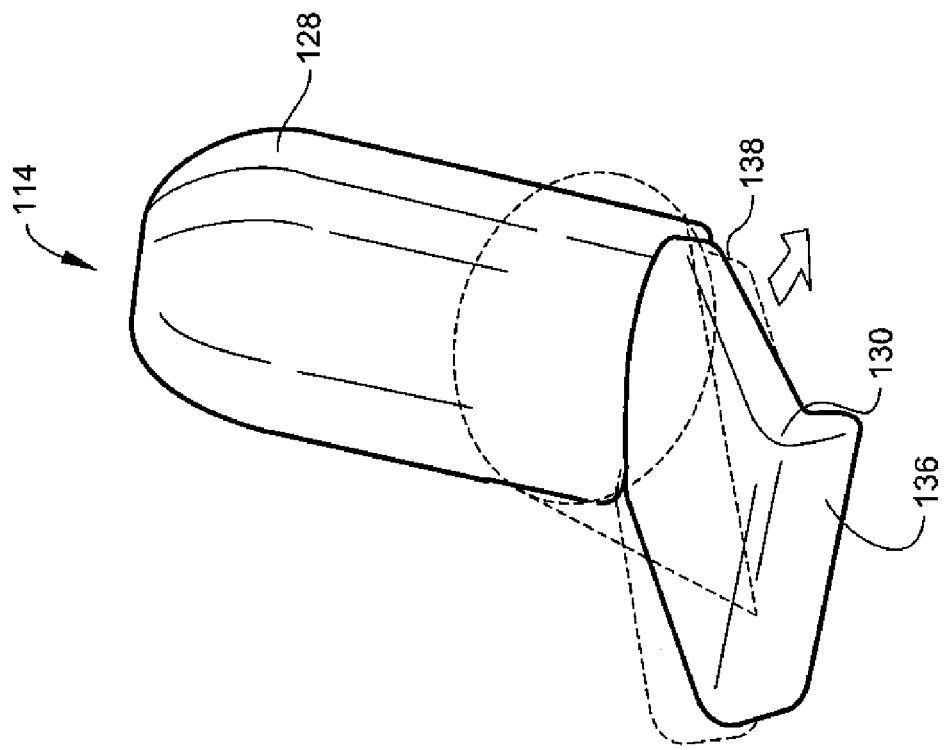
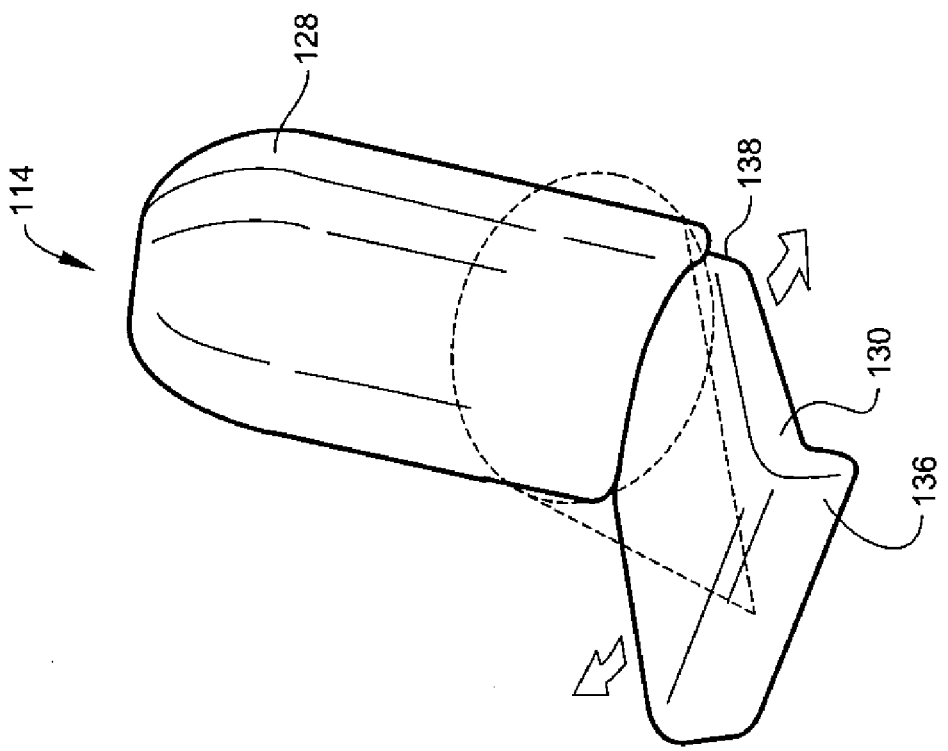

VEHICLE SEATING WITH ARCUATE MOTION SUPPORT

CROSS-REFERENCE TO RELATED APPLICATIONS

This application is a Divisional of application Ser. No. 11/012,930, filed Dec. 15, 2004 now U.S. Pat. No. 7,083,234, which claims the benefit of U.S. Provisional Application No. 60/529,686 filed Dec. 15, 2003, and U.S. Provisional Application No. 60/589,297, filed Jul. 20, 2004.

BACKGROUND OF THE INVENTION

This invention relates generally to vehicle seating and more particularly to a tourist/coach class aircraft seating arrangement. Aircraft seating is typically divided into various classes, for example first class, business class, and coach or tourist class. For each class of seating, an individual passenger is allotted a preselected amount of space (both area and volume). First-class seats provide the most individual space, and also may include features to improve comfort, such as fully reclining sleeper functions. In contrast, the tourist/coach class is provided with a relatively small amount of space, in order to provide the most efficient transportation and lowest cost. However, this space limitation can produce passenger discomfort or possibly even physical ailments, and also makes it difficult for a passenger to find a comfortable position in which to sleep on long flights.

To alleviate discomfort, it is advantageous for a passenger to sit or lie in various non-conventional positions during a flight. Unfortunately, prior art coach class seats do not readily accommodate these varied seating positions.

BRIEF SUMMARY OF THE INVENTION

Accordingly, it is an object of the invention to provide a passenger seat accommodating varied seating positions.

It is another object of the invention to provide a passenger seat having a support member which moves in a cylindrical pivoting motion.

These and other objects of the present invention are achieved in the preferred embodiments disclosed below by providing a passenger seat for a vehicle includes a frame for being attached to a floor of a vehicle; a seat bottom carried by the frame for supporting a passenger; and an upwardly-extending seat back carried by the frame, wherein the seat back is pivotable in an arcuate motion about an upwardly-extending first axis which is not parallel to a long axis of the seat back.

According to another embodiment of the invention, the first axis passes through an upper end of the seat back and through a rear portion of the seat bottom.

According to another embodiment of the invention, the passenger seat further includes means for selectively locking the seat back in a desired orientation.

According to another embodiment of the invention, the seat bottom is pivotable in an arcuate motion about a generally longitudinally-extending second axis which is not parallel to a long axis of the seat bottom.

According to another embodiment of the invention, the second axis passes through a forward end of the seat bottom and through a lower portion of the seat back.

According to another embodiment of the invention, the passenger seat further includes means for selectively locking the seat back in a desired orientation.

According to another embodiment, a passenger seat for a vehicle includes: a frame for being attached to a floor of a vehicle; a seat bottom carried by the frame for supporting a passenger, wherein the seat bottom is pivotable in an arcuate motion about a generally longitudinally-extending first axis which is not parallel to a long axis of the seat bottom; and an upwardly-extending seat back carried by the frame.

BRIEF DESCRIPTION OF THE DRAWINGS

The subject matter that is regarded as the invention may be best understood by reference to the following description taken in conjunction with the accompanying drawing figures in which:

FIG. 9 is another partial perspective view of the seat set of FIG. 5, showing one of the seat bottoms thereof; and FIG. 10 is a perspective view of the seat bottom shown in FIG. 8 in a rotated position.

DETAILED DESCRIPTION OF THE INVENTION

Figure 1:
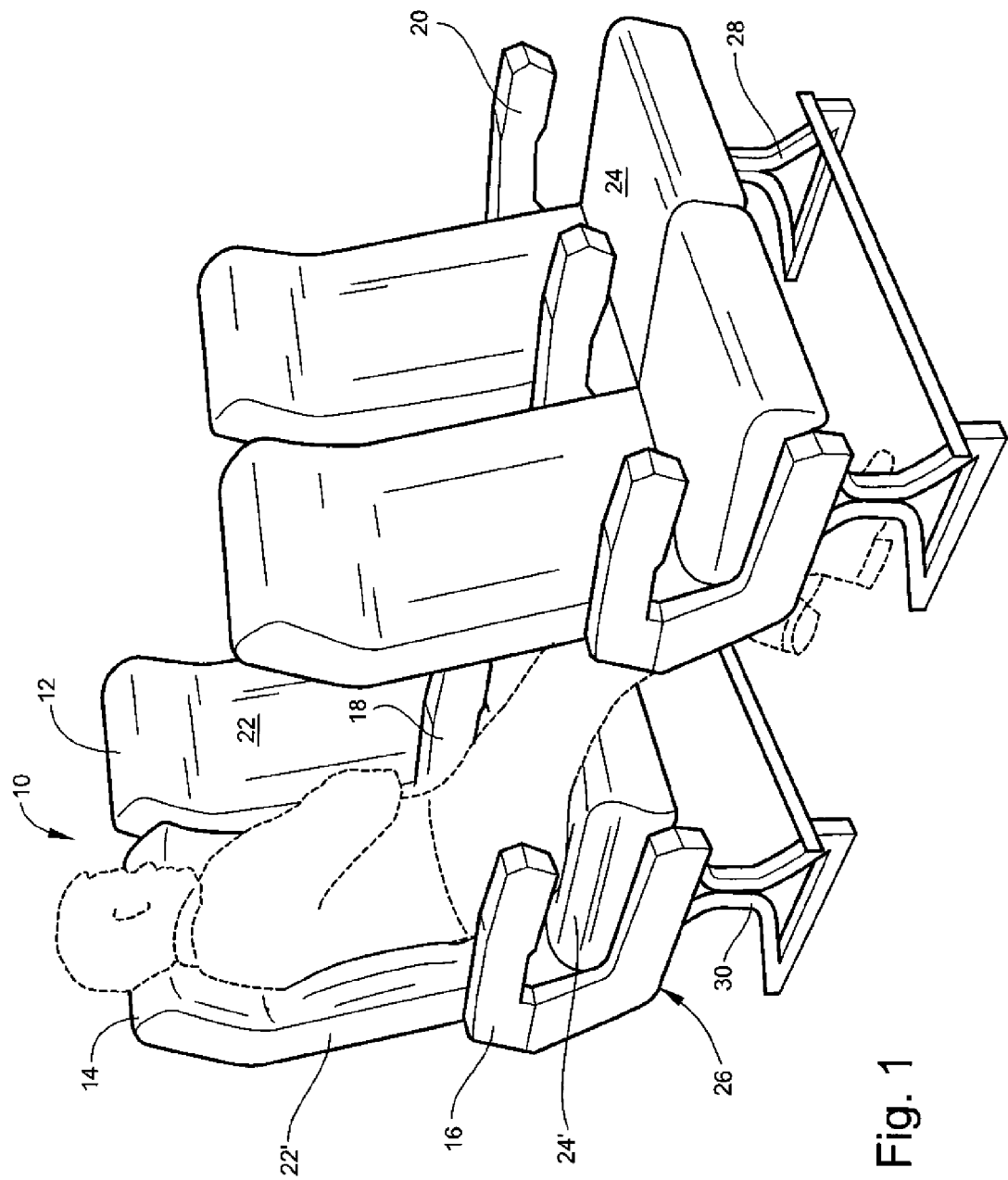
FIG. 1 is a perspective view of a seat set incorporating a cylindrical motion back and bottom.

Referring to the drawings wherein identical reference numerals denote the same elements throughout the various views, FIGS. 1-4 illustrate a passenger seat set 10 incorporating one or more cylindrical motion pivoting supports. The seat set 10 includes two seats 12 and 14 which are collectively provided with three arm rests 16, 18, and 20, each shown in the lowered passenger use position. The seats include seat backs 22 and 22', and seat bottoms 24 and 24', respectively. The seats 12 and 14 are supported by a frame 26. The frame 26 is mounted on legs 28 and 30 which are in turn mounted to the deck of the aircraft by track fittings of a known type. For illustrative purposes, the pivoting supports are only shown in detail with respect to the seat 14, however it will be understood that the same type of supports may also be implemented on the other seat 12.

Figure 2:
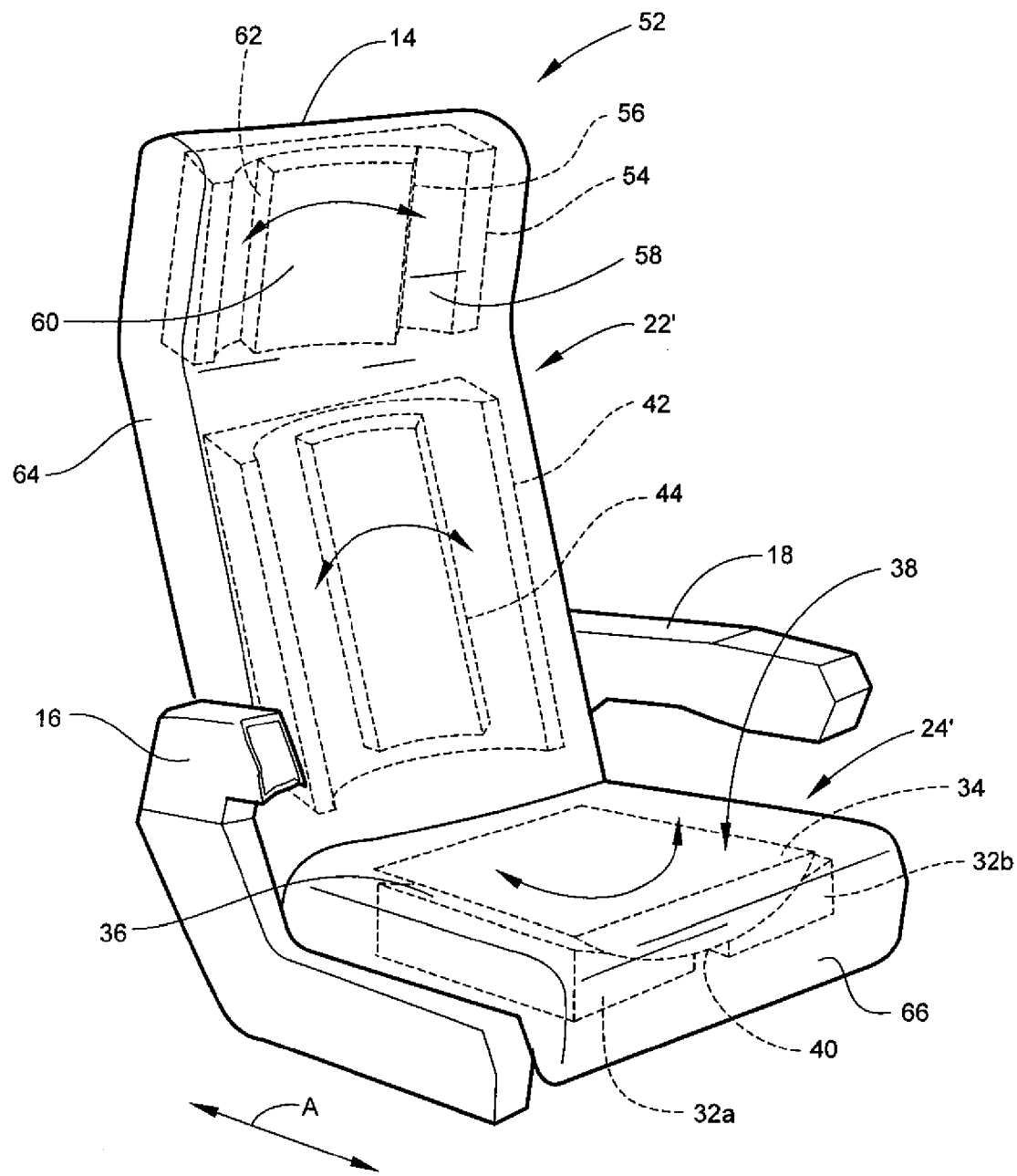
FIG. 2 is a perspective view of one of the seats shown in FIG. 1.
Figure 3:
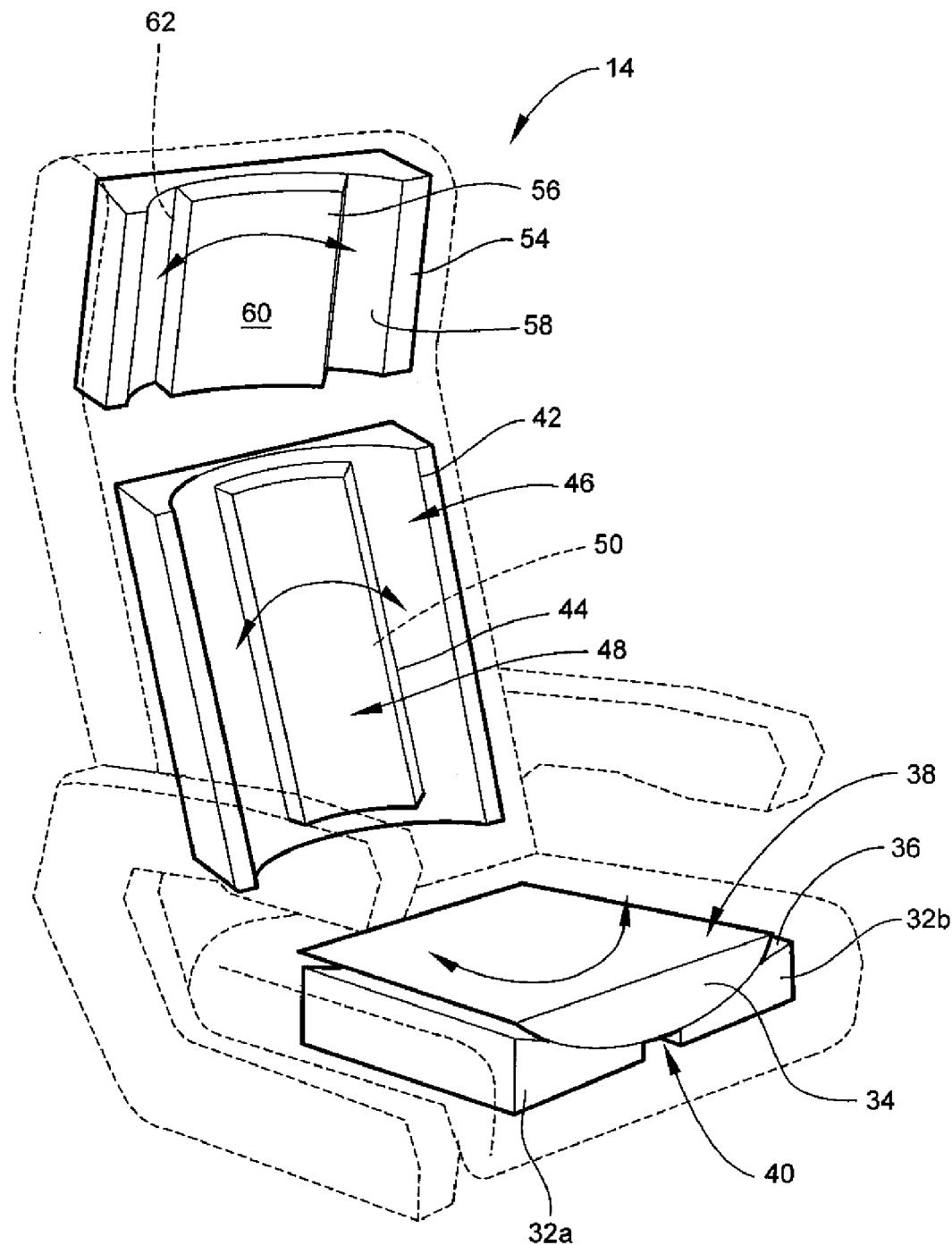
FIG. 3 is another perspective view of the seat shown in FIG. 1, showing the details of its internal construction.

Referring to FIG. 2, the seat bottom 24' has an internal structure which includes one or more stationary bottom members 32a and 32b, and a movable bottom member 34. The stationary bottom members 32 cooperate to define an upper surface 36 having a cylindrical curvature with the axis of the defining cylinder aligned generally parallel to a longitudinal direction "A" of the aircraft. The movable bottom member 34 has an upper surface 38 for supporting a passenger's weight, and a lower surface 40 having a cylindrical curvature with the axis of the defining cylinder aligned generally parallel to a longitudinal direction "A" of the aircraft. The stationary and movable bottom members 32 and 34 may both be constructed of any material which will support the required weight and will remain sufficiently rigid to move relative to each other. One example of a suitable material is molded plastic.

Figure 4:
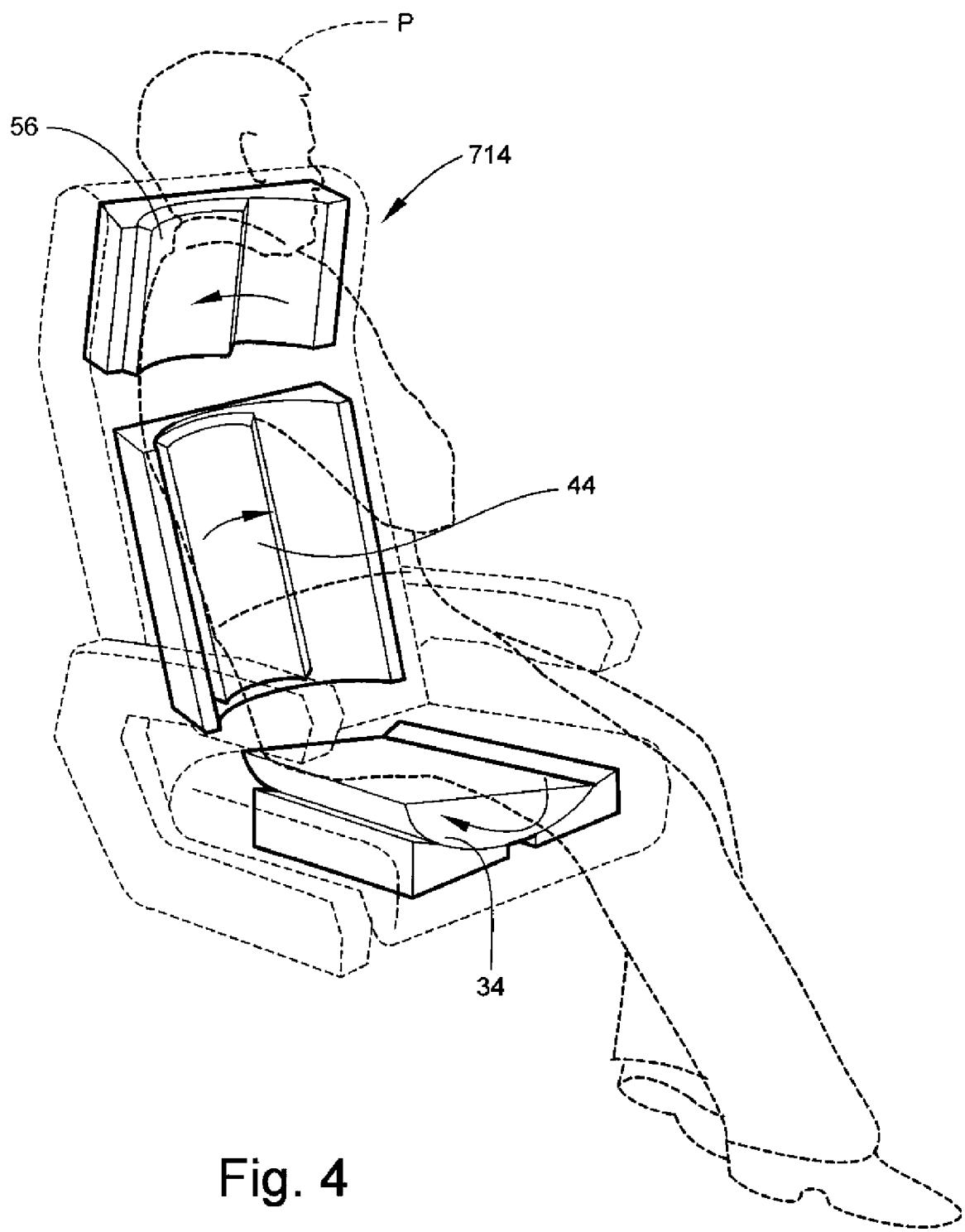
FIG. 4 is a perspective view of the seat shown in FIG. 1, showing a passenger seated thereon.
Figure 5:
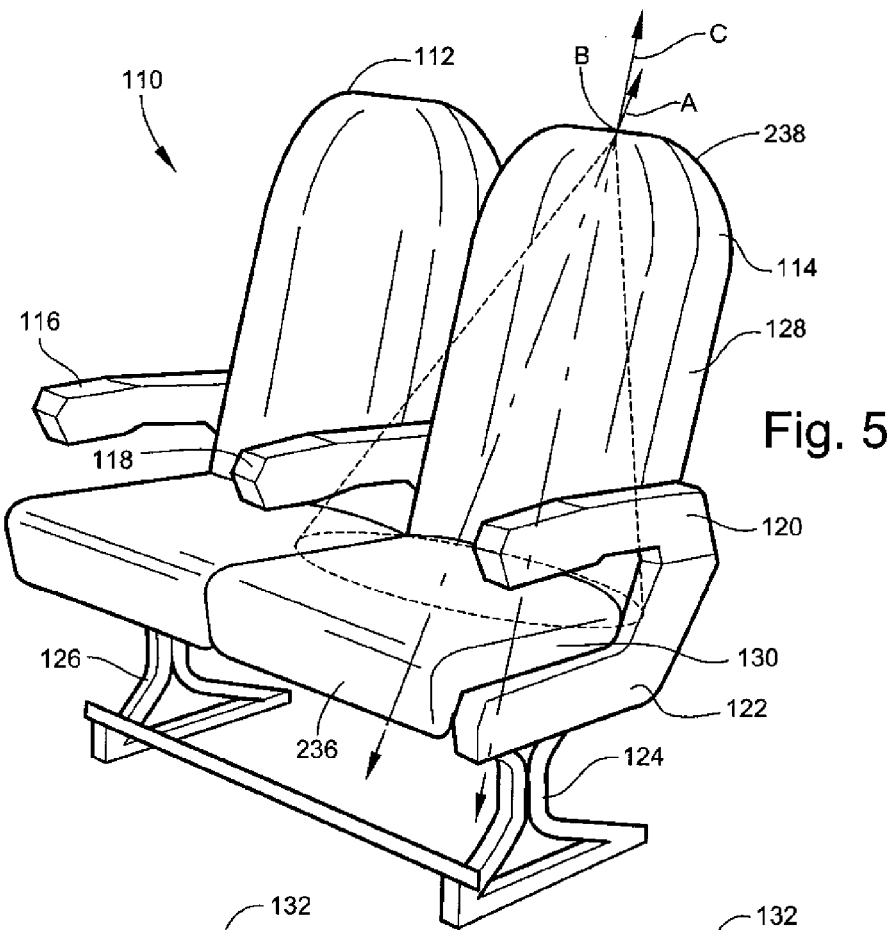
FIG. 5 is a perspective view of a seat set having a pivotable seat back.
Figures 6, 7:
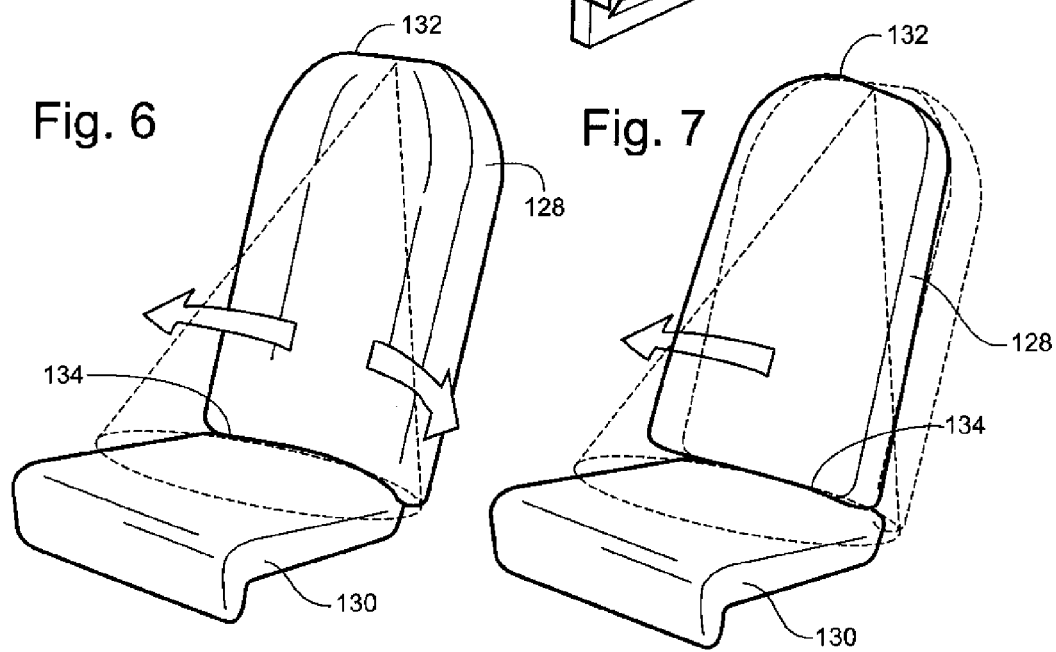
FIG. 6 is another perspective view of the seat set of FIG. 5.
FIG. 7 is a partial perspective view of the seat set of FIG. 5, showing one of the seat backs thereof.
Figure 8:
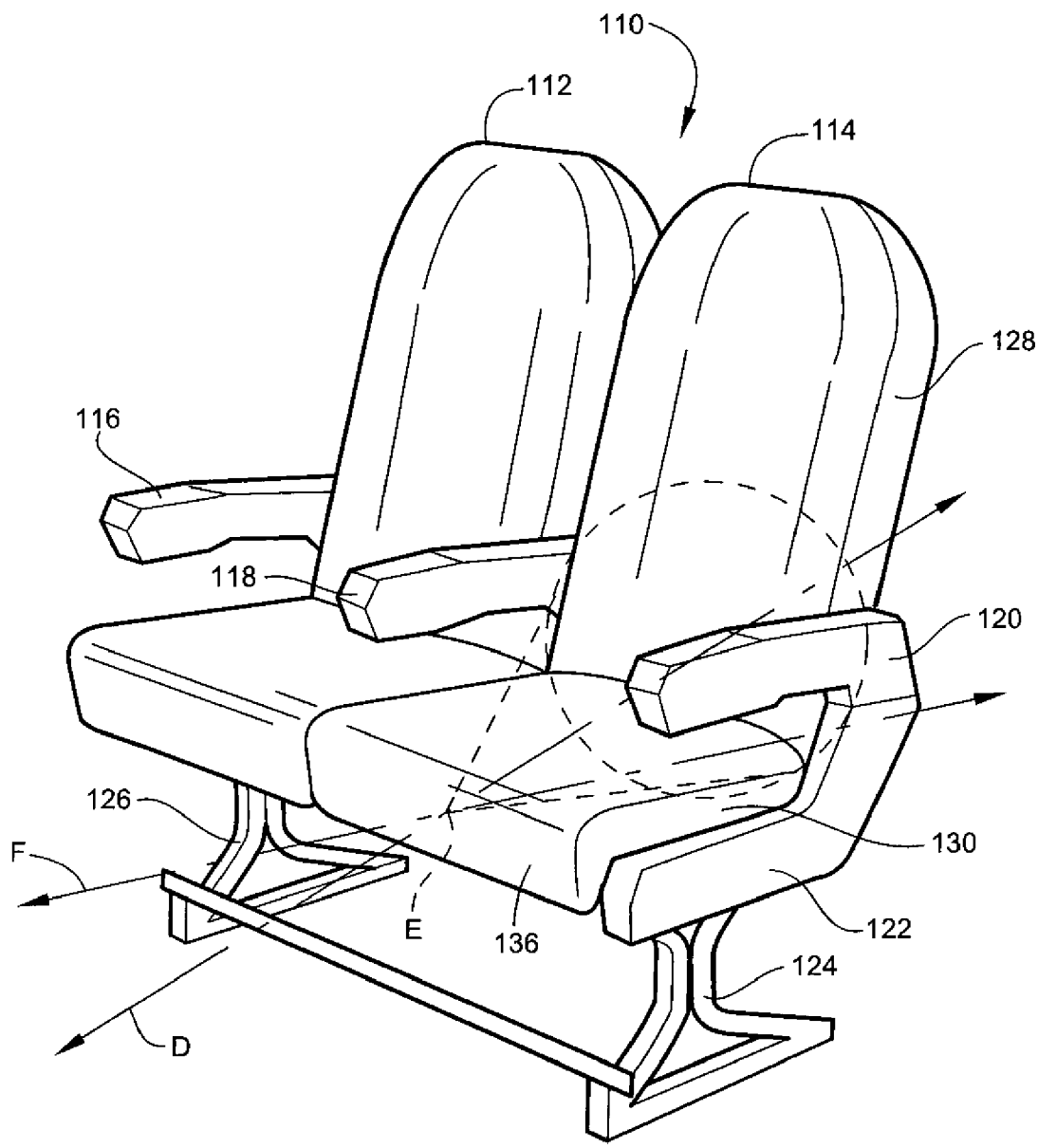
FIG. 8 is a perspective view of the seat back shown in FIG. 7 in a rotated position.

The upper surface 38 of the stationary bottom member 32 and the lower surface 40 of the movable bottom member 34 may be made smooth to minimize the friction therebetween. In operation, the movable bottom member 34 can be slid or pivoted laterally relative to the stationary bottom member 32 so that its upper surface 40 lies in a tilted position, as shown in FIG. 4. This movement could be effected manually, or the movable bottom member 34 could be connected to an actuator of a known type (not shown) for pivoting the movable bottom member 34 under power. Alternatively, the moveable bottom member 34 and the and the stationary bottom members 32 may be provided with suitable fasteners or connectors such that the moveable back member 34 may be physically disconnected from the stationary bottom member 32 and then reconnected in a different position. For example the stationary bottom member 32 and the moveable bottom member 34 may be provided with complementary hook-and-loop fasteners of a known type (not shown).

The seat back 22' has an internal structure which includes a stationary back member 42 and a movable back member 44. The stationary back member 42 defines a forward surface 46 having a cylindrical curvature with the axis of the defining cylinder aligned generally upright or vertical relative to the aircraft. The movable back member 44 has a forward surface 48 for supporting a passenger's weight, and a rear surface 50 having a cylindrical curvature with the axis of the defining cylinder aligned generally upright or vertical relative to the aircraft. The stationary and movable back members 42 and 44 may both be constructed of any material which will support the required weight and will remain sufficiently rigid to move relative to each other. One example of a suitable material is molded plastic. As shown, the movable back member 44 is relatively narrow and is designed to provided support for a seated passenger's spine without extending too far past the sides of the seat back 24' even in a deflected position. However, the movable back member 44 could be made wider or of a different shape as required to suit a particular application.

The forward surface 46 of the stationary back member 42 and the rear surface 50 of the movable back member 44 may be made smooth to minimize the friction therebetween. In operation, the movable back member 44 can move in an arcuate motion relative to the stationary back member 42 so that its forward surface 48 lies in a tilted position, as shown in FIG. 4. This movement could be effected manually, or the movable back member 44 could be connected to an actuator of a known type (not shown) for pivoting the movable back member 44 under power. Alternatively, the moveable back member 44 and the and the stationary back member 42 may be provided with suitable fasteners or connectors such that the moveable back member 44 may be physically disconnected from the stationary back member 42 and then reconnected in a different position. For example the stationary back member 42 and the moveable back member 44 may be provided with complementary hook-and-loop fasteners of a known type (not shown).

The seat 14 has a headrest 52 with an internal structure which includes a stationary headrest member 54 and a movable headrest member 56. The stationary headrest member 54 defines a forward surface 58 having a cylindrical curvature with the axis of the defining cylinder aligned generally upright or vertical relative to the aircraft. The movable headrest member 56 has a forward surface 60 for supporting a passenger's weight, and a rear surface 62 having a cylindrical curvature with the axis of the defining cylinder aligned generally upright or vertical relative to the aircraft. The stationary and movable headrest members 54 and 56 may both be constructed of any material which will support the required weight and will remain sufficiently rigid to move relative to each other. One example of a suitable material is molded plastic. As shown, the movable headrest member 56 is relatively narrow and is designed to provided support for a seated passenger's spine without extending too far past the sides of the seat back 22'. However, the movable back member 56 could be made wider or of a different shape as required to suit a particular application.

The forward surface 58 of the stationary headrest member 54 and the rear surface 62 of the movable headrest member 56 are smooth to minimize the friction therebetween. In operation, the movable headrest member 56 can move in an arcuate motion relative to the stationary headrest member 54 so that its forward surface 60 lies in a tilted position, as shown in FIG. 4. This movement could be effected manually, or the movable headrest member 56 could be connected to an actuator of a known type (not shown) for pivoting the movable headrest member 56 under power. Alternatively, the moveable headrest member 56 and the and the stationary headrest member 54 may be provided with suitable fasteners or connectors such that the headrest member 56 may be physically disconnected from the stationary headrest member 54 and then reconnected in a different position. For example the stationary headrest member 54 and the headrest member 56 may be provided with complementary hook-and-loop fasteners of a known type (not shown).

In the illustrated example, the seat back 22' and seat bottom 24' are covered with respective dress covers 64 and 66 which provide a unified appearance to the seat 14 and prevent debris from falling into the working parts of the seat 14.

FIGS. 1 and 4 illustrate a representative passenger "P" seated on the seat 14 in a "side sleeping" posture in which his hips and shoulders are turned sideways, roughly 90° to a conventional seated position. The movable headrest, back, and bottom members 54, 44 and 34 are positioned such that they provide lateral support and assist the passenger in comfortably maintaining this posture without muscular activity by the passenger. When the passenger wishes to return to a conventional seating posture the movable members are simply moved back to their centered positions.

FIGS. 5-10 illustrate a passenger seat set including a rotatable seat back and seat bottom, shown generally at reference numeral 110. The seat set 110 includes two seats 112 and 114 which are collectively provided with three arm rests 116, 118, and 120, each shown in the lowered passenger use position. The seats 112 and 114 are supported by a frame 122. The frame 122 is mounted on legs 124 and 126, which are in turn mounted to the deck of the aircraft by track fittings of a known type. For illustrative purposes, the rotatable seat back is only shown with respect to the seat 114, however it will be understood that this feature may also be implemented on the other seat 112. The seat 114 includes a seat back 128 and a seat bottom 130.

The seat back 128 has an upper end 132 and a lower end 134. The seat back 128 is able to rotate about an axis "A" (see FIG. 5) which passes through the center of the upper end 132 of the seat back 128, at a pivot point "B". The axis "A" is not parallel to the long axis "C" of the seat back 128, and in this example it passes approximately through the center of the seat bottom 130. The lower end 134 of the seat back 128 is provided with appropriate means to allow it to translate in an arc, such as a track or a rub strip (not shown), as well as means for locking the seat back 128 in the desired position. The seat back 128 is able to move left or right in a "conical" type motion to a deflected position, shown in solid lines in FIG. 7, where it provides support for the back of a passenger who is seated in a "side sleep" position, helping the passenger to remain rotated relative to a normal sitting position.

The seat bottom 130 may also be able to rotate about an axis "D" (see FIG. 8) which passes through the center of the front end 136 of the seat bottom 130, at a pivot point "E". The axis "D" is not parallel to the long axis "F" of the seat bottom 130, and in this example it passes approximately through the lower third of the seat back 128. The rear end 138 of the seat bottom 130 is provided with appropriate means to allow it to translate in an arc, such as a track or a rub strip (not shown), as well as means for locking the seat bottom 130 in the desired position. The seat bottom 130 is able to move left or right in a "conical" type motion to a deflected position, shown in solid lines in FIG. 10, where it provides support for a passenger who is seated in a "side sleep" position, helping the passenger to remain rotated relative to a normal sitting position. The motion of the seat bottom 130 may be independent, or it may be coordinated with the motion of the seat back 126.

The foregoing has described a seating arrangement having an arcuate motion seat back and bottom. These seat features may be combined with each other as desired to produce a seat having multiple comfort features. While specific embodiments of the present invention have been described, it will be apparent to those skilled in the art that various modifications thereto can be made without departing from the spirit and scope of the invention. Accordingly, the foregoing description of the preferred embodiment of the invention and the best mode for practicing the invention are provided for the purpose of illustration only and not for the purpose of limitation, the invention being defined by the claims.

What is claimed is:

1. A passenger seat for a vehicle, comprising:
    a frame for being attached to a floor of a vehicle;
    a seat bottom carried by the frame for supporting a passenger; and
    an upwardly-extending seat back carried by the frame, wherein the seat back is separately rotatable relative to the seat bottom in an arcuate motion about an upwardly-extending first axis which is not parallel to a long axis of the seat back.

2. The passenger seat of claim 1 wherein the first axis passes through an upper end of the seat back and through an upper surface of the seat bottom.

3. The passenger seat of claim 1 further including means for selectively locking the seat back in a desired orientation.

4. The passenger seat of claim 1 wherein the seat bottom is rotatable in an arcuate motion about a generally longitudinally-extending second axis which is not parallel to a long axis of the seat bottom.

5. The passenger seat of claim 4 wherein the second axis passes through a forward end of the seat bottom and through a forward surface of the seat back.

6. The passenger seat of claim 5 further including means for selectively locking the seat bottom in a desired orientation.

7. A passenger seat for a vehicle, comprising:
    a frame for being attached to a floor of a vehicle;
    a seat bottom carried by the frame for supporting a passenger, wherein the seat bottom is separately rotatable in an arcuate motion about a generally longitudinally-extending first axis which is not parallel to a long axis of the seat bottom with respect to an upwardly-extending seat back carried by the frame.

8. The passenger seat of claim 7 wherein the first axis passes through a forward end of the seat bottom and through a forward surface of the seat back.

9. The passenger seat of claim 8 further including means for selectively locking the seat bottom in a desired orientation.

* * * * *